United States Patent
Bavishi et al.

(10) Patent No.: US 10,831,729 B2
(45) Date of Patent: *Nov. 10, 2020

(54) APPLICATION-CONTROLLED SUB-LUN LEVEL DATA MIGRATION

(71) Applicant: INTERNATIONAL BUSINESS MACHINES CORPORATION, Armonk, NY (US)

(72) Inventors: Pankaj S. Bavishi, Pune (IN); Gaurav Chhaunker, Hyderabad (IN); Carl E. Jones, Tucson, AZ (US); Pankaj O. Khandelwal, Pune (IN); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/801,739

(22) Filed: Mar. 13, 2013

(65) Prior Publication Data

US 2013/0325801 A1 Dec. 5, 2013

Related U.S. Application Data

(63) Continuation of application No. 13/482,819, filed on May 29, 2012.

(51) Int. Cl.
*G06F 16/21* (2019.01)

(52) U.S. Cl.
CPC .................................. *G06F 16/214* (2019.01)

(58) Field of Classification Search
CPC ...................................................... G06F 3/0647
See application file for complete search history.

(56) References Cited

U.S. PATENT DOCUMENTS

| | | | |
|---|---|---|---|
| 6,330,572 B1* | 12/2001 | Sitka | G06F 17/30082 707/608 |
| 7,577,782 B2 | 8/2009 | Lym et al. | |
| 7,707,151 B1* | 4/2010 | Blumenau et al. | 711/165 |
| 8,285,758 B1* | 10/2012 | Bono et al. | 707/822 |
| 9,460,136 B1* | 10/2016 | Todd | G06F 16/2282 |
| 2005/0193238 A1* | 9/2005 | Golasky et al. | 714/6 |
| 2005/0235132 A1 | 10/2005 | Karr et al. | |
| 2007/0055840 A1* | 3/2007 | Yamamoto et al. | 711/165 |
| 2007/0156997 A1* | 7/2007 | Boule et al. | 711/170 |

(Continued)

FOREIGN PATENT DOCUMENTS

| | | |
|---|---|---|
| CN | 1794214 A | 6/2006 |
| CN | 100445966 C | 12/2008 |

(Continued)

OTHER PUBLICATIONS

Dufrasne, et al. IBM System Storage DS8000: z/Os Distributed Data Backup, Redpaper, Nov. 16, 2010, 16 pages.

(Continued)

*Primary Examiner* — Michael Alsip
(74) *Attorney, Agent, or Firm* — Griffiths & Seaton PLLC

(57) ABSTRACT

An application programming interface (API) is used to migrate, from a specified source LUN to a specified target LUN, at least one specified sub-LUN data chunk, the API functioning as an interface between a storage controller and an owning application.

21 Claims, 9 Drawing Sheets

(56) References Cited

U.S. PATENT DOCUMENTS

| | | | |
|---|---|---|---|
| 2007/0220229 A1* | 9/2007 | Tachibana | 711/170 |
| 2008/0059751 A1 | 3/2008 | Nakamura | |
| 2008/0288670 A1* | 11/2008 | Chambliss et al. | 710/33 |
| 2008/0301256 A1* | 12/2008 | McWilliams et al. | 709/214 |
| 2009/0024752 A1 | 1/2009 | Shitomi | |
| 2009/0100223 A1 | 4/2009 | Murayama et al. | |
| 2010/0070726 A1 | 3/2010 | Ngo et al. | |
| 2010/0077168 A1 | 3/2010 | Arakawa | |
| 2010/0205374 A1* | 8/2010 | Meka et al. | 711/117 |
| 2011/0010514 A1* | 1/2011 | Benhase et al. | 711/162 |
| 2011/0082988 A1* | 4/2011 | Kono et al. | 711/161 |
| 2011/0106862 A1* | 5/2011 | Mamidi | G06F 16/185 707/823 |
| 2011/0197046 A1 | 8/2011 | Chiu et al. | |
| 2011/0246745 A1 | 10/2011 | Fukui et al. | |
| 2011/0286123 A1* | 11/2011 | Montgomery | 360/15 |
| 2012/0023292 A1* | 1/2012 | Saito et al. | 711/114 |
| 2012/0059994 A1* | 3/2012 | Montgomery et al. | 711/119 |
| 2013/0325801 A1 | 12/2013 | Bavishi et al. | |
| 2013/0325802 A1 | 12/2013 | Bavishi et al. | |
| 2013/0326182 A1 | 12/2013 | Bavishi et al. | |
| 2013/0326183 A1 | 12/2013 | Bavishi et al. | |
| 2013/0326545 A1* | 12/2013 | Bavishi et al. | 719/328 |
| 2013/0326546 A1 | 12/2013 | Bavishi et al. | |

FOREIGN PATENT DOCUMENTS

| | | |
|---|---|---|
| CN | 101436152 A | 5/2009 |
| CN | 101582013 A | 11/2009 |
| JP | 2006079274 A | 3/2006 |
| JP | 2011216052 A | 10/2011 |

OTHER PUBLICATIONS

Netapp, "Storage Data Movement Offload" Retrieved from URL:http://www.snia.org/sites/default/files2/SDC2011/presentations.monday/FrederickKnight_Storage_Data_Movement_Offload.pdf on May 11, 2015, Storage Developer Conference (26 pages).

Wilson, S., "Working Draft SCSI Extended Copy Command", Apr. 2, 1999 Internet Citation XP002217164, Retrieved from URL: ftp://ftp.t10.org/t10/document.99/99-143r1.pdf on Oct. 17, 2002 (34 pages).

"FalconStor Data Migration," FalconStor Software, Solution Brief, 2009 (2 pages).

"HP 3PAR Dynamic Optimization Software—Overview & Features," Hewlett-Packard Development Company, L.P., Feb. 8, 2012 (2 pages).

* cited by examiner

APPLICATION-CONTROLLED SUB-LUN LEVEL DATA MIGRATION

CROSS REFERENCE TO RELATED APPLICATIONS

This application is a Continuation of U.S. patent application Ser. No. 13/482,819, filed on May 29, 2012.

FIELD OF THE INVENTION

The present invention relates in general to computers, and more particularly to a method, system, and computer program product for enhancing storage performance in computing storage environments.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

The need for data migration is a real life requirement at all data centers that arises due to various reasons. Such data migration must be transparent to the application (i.e., with accompanying zero downtime for an application). Today, data migration is a feature provided by storage virtualization software installed on the host or storage controllers. In the present approach, however, an application cannot exercise control over which portions of data must be migrated to a new storage location for data migration orchestrated by storage controllers. Host based migration solutions do not provide a generic interface to allow applications control over which portions of data must be migrated. Host based migration solutions also suffer from the fact that they must move data to & from the host, in order to effect the data migration. This control is beneficial for applications such as a database that may necessitate data migration at a much more granular level than an entire Logical Unit Name (LUN) or, more generically, a general storage unit. Instead, and as will be further described, data migration decisions are often taken without knowledge of the application. This can result in situations where migration is orchestrated after the peak performance requirement for such data movement may have already passed because heavy workload that is spiky in nature cannot be detected by standard monitoring mechanisms available inside Storage controllers today. Hence, a need exists for a mechanism by which granular portions of storage may be migrated by a storage controller, on application demand.

Accordingly, and in view of the foregoing, various embodiments for performing sub-Logical Unit Name (LUN) data migration by a processor in a computing environment are provided. In one embodiment, by way of example only, a method for such sub-LUN data migration is disclosed. An application programming interface (API) is used to migrate, from a specified source LUN to a specified target LUN, at least one specified sub-LUN data chunk, the API functioning as an interface between a storage controller and an owning application.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
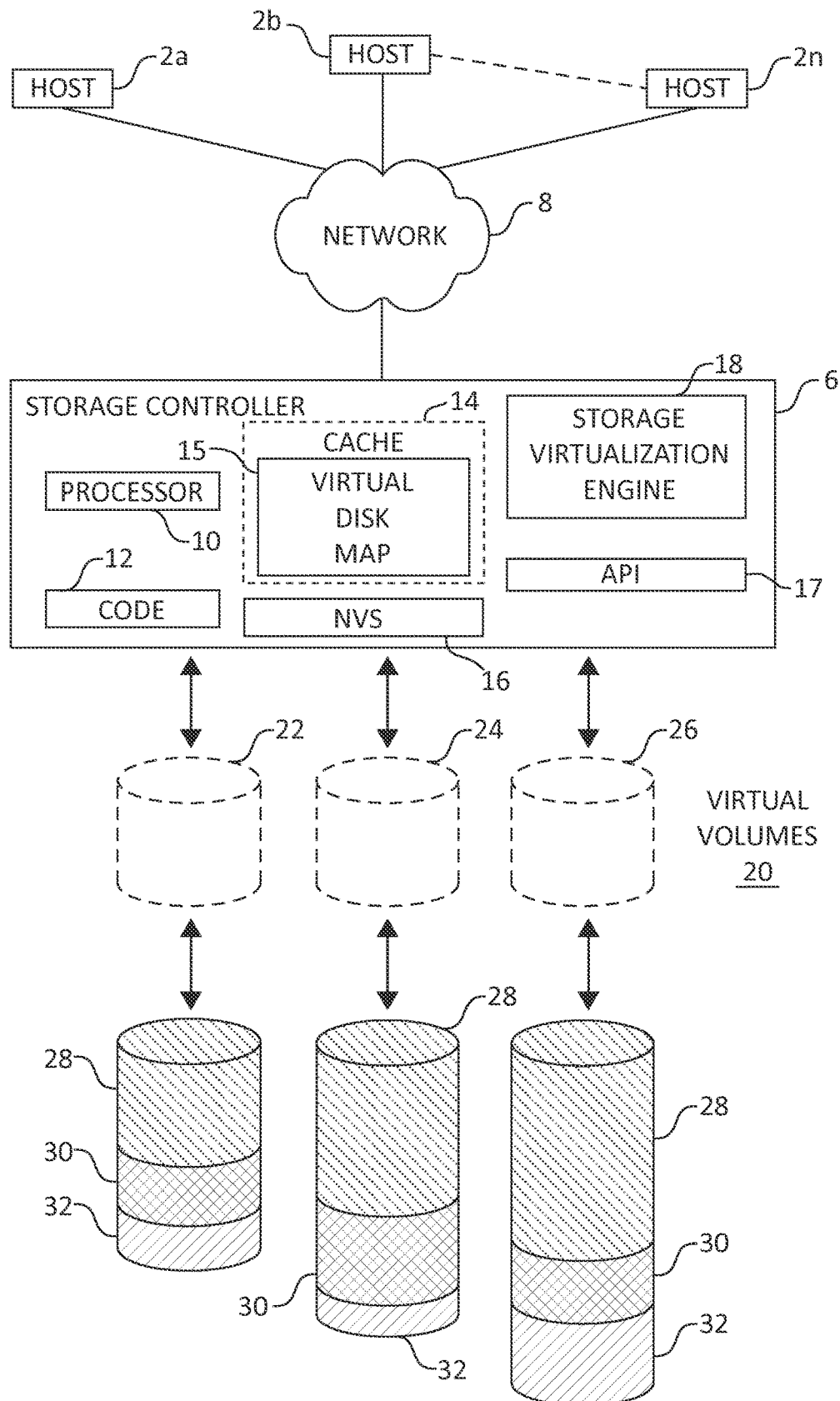
FIG. 1 is a block diagram illustrating an exemplary multi-tiered data storage computing environment which may implement aspects of the present invention.

As previously mentioned, the need for data migration is a real life requirement at all data centers that arises due to various reasons. Examples of such occasions include: (a) the need to move data from one storage array to another due to lease expiry of the actively used storage array; (b) the need to migrate less frequently used data to lower tiered storage;

and (c) upgrading to a high performance and capacity storage array to meet organization's growth requirements. Data migration must be transparent to the owning application, with accompanying zero downtime for the owning application.

Again, as previously described, data migration today is a feature provided by storage virtualization software installed on the host, such as Logical Volume Manager (LVM) for Linux® compatible environments and Veritas® Volume Manager, and facilitated through storage controllers (e.g., IBM® System Storage DS800 or Storwize® V7000), and network storage virtualizers (e.g., IBM® SAN Volume Controller (SVC)). In one example, if there is a need to migrate data for a LUN of size 1 TB, the entire LUN is migrated from 1 TB of backend storage that is currently in-use to a new storage of size 1 TB. Thus, in the present approach, the entire data stored on a particular LUN is migrated onto a new location.

In the present approach, however, an application cannot exercise control over which portions of data must be migrated to a new storage location. This is useful for applications such as a database that may need to migrate data at a much more granular level than an entire LUN. Consider the following example. An owning application, in this case a database (i.e., Oracle®) wishes to migrate only a single table (or record) from current storage to a new storage location because the data on a given table is no longer frequently accessed. This type of partial data migration of a LUN that is controlled by the application is not possible by traditional migration methods provided by storage virtualizers.

While it is possible to migrate data at the sub-LUN level, conventionally the decisions to undertake such migration are taken by monitoring and analysis of data access patterns at the storage controller level. Since the storage controller has no knowledge of the semantics of the data, it is possible that the migration may be triggered at a time when, for example, peak performance requirements have already passed. The applicable layer that can make the quickest decisions on which data must be migrated and when is the application that generates the data. Hence, the problem of application awareness and application-based decision making remains unaddressed by existing solutions.

Several conventional techniques attempt to address the challenge of sub-LUN level data migration. First, storage controllers (also known as storage arrays) provide a limited ability to migrate data from physical storage associated with a LUN to another physical storage, transparently to an application. However, such migration is performed for the entire LUN, hence making the process unsuitable for situations requiring migration of only portions of the data an application has stored on a particular LUN. In addition, storage controllers usually allow data migration only across devices associated with a same vendor, and thereby promote vendor lock-in and tend to be costly or otherwise resource intensive.

Second, storage virtualization software running on a host provide data migration use cases that potentially span across disk array vendors, and hence do not promote vendor lock-in. However, conventional virtualization software migrate data for an entire LUN from one physical storage to another physical storage. This means that convention virtualization software poses challenges for applications needing to migrate data at a sub-LUN level.

Third, proprietary volume management and file system software (for database files, for example) allows for sub-LUN level data movement across differing physical storages. However, such data migration requires data to be read from the concurrently-used physical storage to the host, and from the host, the data is written to the new storage. This process consumes both storage network bandwidth for data migration as well as central processing unit (CPU) bandwidth on the host, which reduces storage network and/or server performance. In addition, such proprietary software is vendor-specific to a particular vendor-based implementation.

In contrast to the techniques previously described, the mechanisms of the illustrated embodiments describe techniques where application programming interfaces (APIs) exposed by storage virtualization software enable an application to trigger data migration from current physical storage to a new location at a sub-LUN level. By use of these mechanisms, the application is allowed specify the start LBA (Logical Block Address) and size of a chunk of data on a virtual disk and a target physical storage description to identify physical storage to which data must be migrated. On receipt of this API call, the storage virtualization software will migrate data from its current storage location to the specified target storage location transparently from the application. Upon completion of the operation, the virtual disk map on the storage is atomically modified to point to the new location for the data. The old physical data storage location is freed. This API can be manifested in the form of a new SCSI command or use existing SCSI commands like XCOPY. There can be other out-of-band manifestations of the API as well.

The mechanisms of the illustrated embodiments provide several advantages, including the following. First, the sub-LUN level migration API exposed by storage virtualization software can allow applications to migrate portions of data within a LUN from one physical storage to another. This will enable applications to migrate individual records, tables or table spaces to new physical storage depending on the needs of the application. As a result, less frequently accessed tables/records can be moved to lower tier storage that consumes less expensive storage, or very frequently accessed data can be moved to a higher tier of storage that can satisfy higher IOPs requirements.

Second, the sub-LUN level migration APIs exposed by storage virtualizers in the storage area network (SAN), such as various proprietary volume controllers, allow for migration of data from one physical storage to another without the necessity of reading the entire data to the host and then writing the data to new storage. This preserves storage network bandwidth and prevents the use of host CPU cycles to orchestrate data migration.

Third, the sub-LUN level migration gives the control to the application to determine which parts of data on a particular LUN must be migrated to other physical storage depending on the use case. Since the application has complete knowledge about the semantics associated with its data, it is likely to make the quickest and best decisions on which data to move and when.

Fourth, the sub-LUN level migration provided by storage controllers will benefit applications from various vendors. Other applications running on the host can also benefit from such an API. Finally, the sub-LUN level migration provided by storage virtualization software can enhance the ability of an application to instantaneously react to the current needs for storing data in different kinds of storage based upon the performance and cost of the storage on which the data is placed. If the storage virtualization software has to monitor data access patterns in order to make a decision about "hotspots" migration, the benefits of migration can be felt only after a delay (possibly at a point when the need for higher performance is gone).

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing storage environment in which aspects of the invention may be implemented. A plurality of host systems 2a, b . . . n transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems 2a, b . . . n in lieu of presenting a number of physical or logical volumes (often which may be physically configured in a complex relationship). The host systems 2a, b . . . n may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache system 14 and non-volatile storage unit 16, such as a battery backed-up memory device. The storage controller 6 stores in cache 14 data updates received from the hosts 2a, b . . . n to write to the virtual storage volumes 22, 24, and 26 (and thereby to volumes 28, 30, and 32) as well as data read from the volumes 28, 30, and 32 to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Storage controller 6 also includes a source code-based specification for use as an interface between storage controller 6 and an owning application operational on the hosts 2a, b . . . n. In the depicted embodiment, this specification/ interface is represented as an application programming interface (API) 17. API 17 is presented by the storage controller 6 to the hosts 2a, b . . . n, and specifically to an owning application operational on the hosts 2a, b . . . n as will be further described. Further, the storage controller 6 also includes storage virtualization engine 18, which may act in conjunction the API 17 to accomplish purposes of the illustrated embodiments as again, will be further described.

Cache system 14 includes a virtual disk map 15, or "storage map" 15 for short. Cache system 14 accepts write data from hosts 2a, b . . . n or similar devices, that is then placed in cache memory. In one embodiment, storage map 15 includes various physical-to-virtual mappings of data for tying physical volume 28, 30, and 32 to virtual volumes 22, 24, 26, and the like.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems 2a, b . . . n, the underlying physical configuration may take many possible forms. For example, a number of interrelated storage devices in various classes, such as SSD, SATA, HDD, tape, etc. may comprise the storage volumes 28, 30, and 32 depending on a particular configuration.

Various components of the storage environment, such as processor 10, may be adapted to implement aspects of the present invention and following claimed subject matter. For example, a storage virtualization engine 18 may operate in conjunction with processor 10 to perform various functionality to be further described, such as providing virtualization functionality in conjunction with the virtual disk map 15. Similarly, the API may also operate in conjunction with processor 1, or other components operational in the storage environment. One of ordinary skill in the art will appreciate that other various data processing and memory components may be implemented to realize these aspects, and may be operational on the storage controller 6, or elsewhere.

In one embodiment of the present invention, the storage controller 6 provides the API 17 to migrate a specified size of data from the physical storage (e.g., 28, 30, 32) behind a LUN to a new physical location, transparently from the application operational on the host 2a . . . 2b . . . n. This API 17 can be invoked by applications like a database (Oracle® or DB2) to migrate only specific data from one physical location to another while not disturbing the LUN that is used to store the data.

Some example APIs provided for use by an owning application include the following:

1) migrate(sourceLUN #, startLBA, size, target storage pool)

With this API, Storage Virtualization software chooses target location where the migrated data must be placed. The choice of target storage pool is made by the application while the location of data on the target storage pool is left to the Storage Viruralization software.

2) migrate(sourceLUN #, startLBA, size, targetLUN #, targetLBA)

Using this API, the application controls the target LUN and exact location where the data must be migrated to. Hence complete control is exercised by the application while migrating data.

3) migrate(sourceLUN #, startLBA, target storage pool id) migrate(sourceLUN #, startLBA, targetLUN #, targetLBA)

In the above manifestation of the API calls, the size of storage migrated for each API call is fixed i.e. say 128 k or 256 k depending upon the implementation. The caller must call the API multiple times to migrate the required size of data.

4) migrate(sourceLUN #, startLBA, size, targetLUN #, targetLBA, time)

In the above API call, the application not only requests data migration from a source LUN to a target LUN, it also mentions the time at which the migration operation must be executed. Note, to ease implementation difficulties, in one embodiment, the start and target LBAs and size parameters may be restricted to specific alignments (e.g., 1 GB extents) Note: To ease implementation difficulties, it may be necessary to restrict the start and target LBAs and size parameters to specific alignments, e.g. the 1 GB extents of DS8000.

Some exemplary use cases for the aforementioned data movement are provided, following. In a first example, an owning application wishes to migrate a specific record or database table from the current location on a given LUN to lower tier storage that consumes less power and is less resource intensive. This maybe triggered by the need to move older (infrequently accessed) data to more cost-effective storage for long-term retention. For example, this operation will migrate data from a cost intense storage array running all fibre channel (FC) disks at 15 k RPM to a separate, less cost intense storage array running SATA disks at a much lower RPM. In such a scenario, the data migration API is acted upon by a storage virtualization element in the SAN, such as a system volume controller (SVC) to affect the application migration request.

In a second example, the owning application finds that a given record is frequently accessed. The application wishes, therefore, to migrate this region to a better-performing tier of storage (e.g., a solid state drive (SSD) tier or to a 15 k RPM drive pool). This kind of use case may facilitate application controlled "hot spot" migration within a storage controller.

Here it should be noted that the data migration API discussed above is not limited to particular kinds of applications, such as database applications, although it is useful for such purposes. One of ordinary skill in the art will appreciate that the API may be applicable to any owning application having a necessity to migrate data, such as a mail server, or other virtualization applications.

The various embodiments of API's described above may be implemented in a variety of ways suited to a particular application. For example, the API may be provided inline to the owning application via a small computer systems interface (SCSI). In another example, the API may be provided out-of-band to the owning application via an Internet protocol (IP). One of ordinary skill in the art will appreciate that varying implementations of the API's described may be used as required for a specific situation.

In one embodiment, on a storage controller that supports the data migration API functionality previously described, a set of exemplary steps may occur in order to satisfy a migration request.

First, the storage controller that supports the data migration API exposes a list of storage pools that are supported by the Storage Controller along with their performance, redundancy and power consumption characteristics. This information is made available via a Mode Sense small computer systems interface (SCSI) command for example, and can be used by a storage controller to select a target storage pool for data migration.

Second, the aforementioned SCSI command (or, in another embodiment, for example, an out-of-band command depending on the mode of invocation of the migration API) is received by the storage virtualization software that requests data starting from a given startLBA=SLBA1 and size=SZ1 to be migrated from its current location (consisting, for example, of high performance and cost intense 15 k RPM drives) to a differing storage pool (consisting, for example, of less cost intense and energy-efficient 7.2 k RPM drives)

Third, the storage virtualization software then determines a "best fit" for this selected data chunk on the storage target pool. The storage virtualization software then copies data from the current location to the target location (transparently from the application) in the background Fourth, the virtual disk map is then atomically made to point to the new physical location such that only that portion of the LUN is now located on the less costly storage. During this operation, as in all other migration operations, data is kept consistent and up to date.

Fifth, once the map has been atomically changed to reflect the new physical storage location, the migration operation is committed. It is worth bearing in mind that if the API specifies the target physical disk, and where to place the data, the storage controller migrates data to the new location specified by the application, instead of the storage controller choosing the new target location on a specified target pool.

Figure 2:
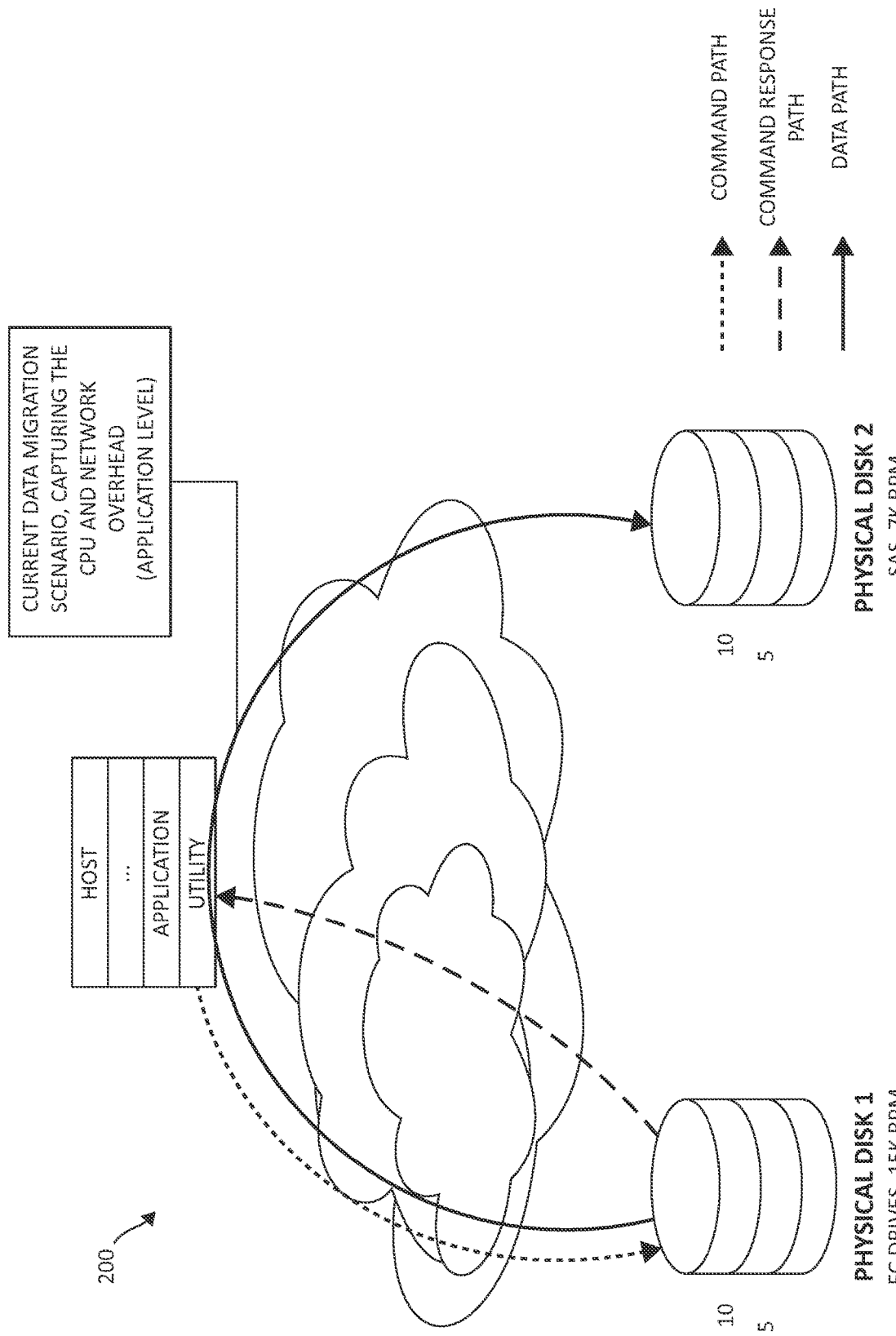
FIG. 2 is a block diagram of a conventional method for performing sub-LUN level data migration.

Turning now to FIG. 2, a block diagram of a conventional data migration mechanism 200 is depicted. The respective data path, command path, and command response path are shown by the indicated arrows and corresponding legend and shown at the application level. As a first step, the owning application/utility sends a command to the physical disk 1 to migrate data from the physical disk 1 (here shown as FC 15 k RPM drive) to physical disk 2 (here shown as a less cost-intensive serial attached SCSI (SAS) 7 k RPM drive). The command response is then returned from the physical disk 1 (i.e., the storage controller responsible for physical disk 1) to the utility/owning application. The data is then pulled to the host, and then written back to the new location on the physical disk 2 as shown. This scenario consumes storage bandwidth as well as server resources to execute.

Figure 3:
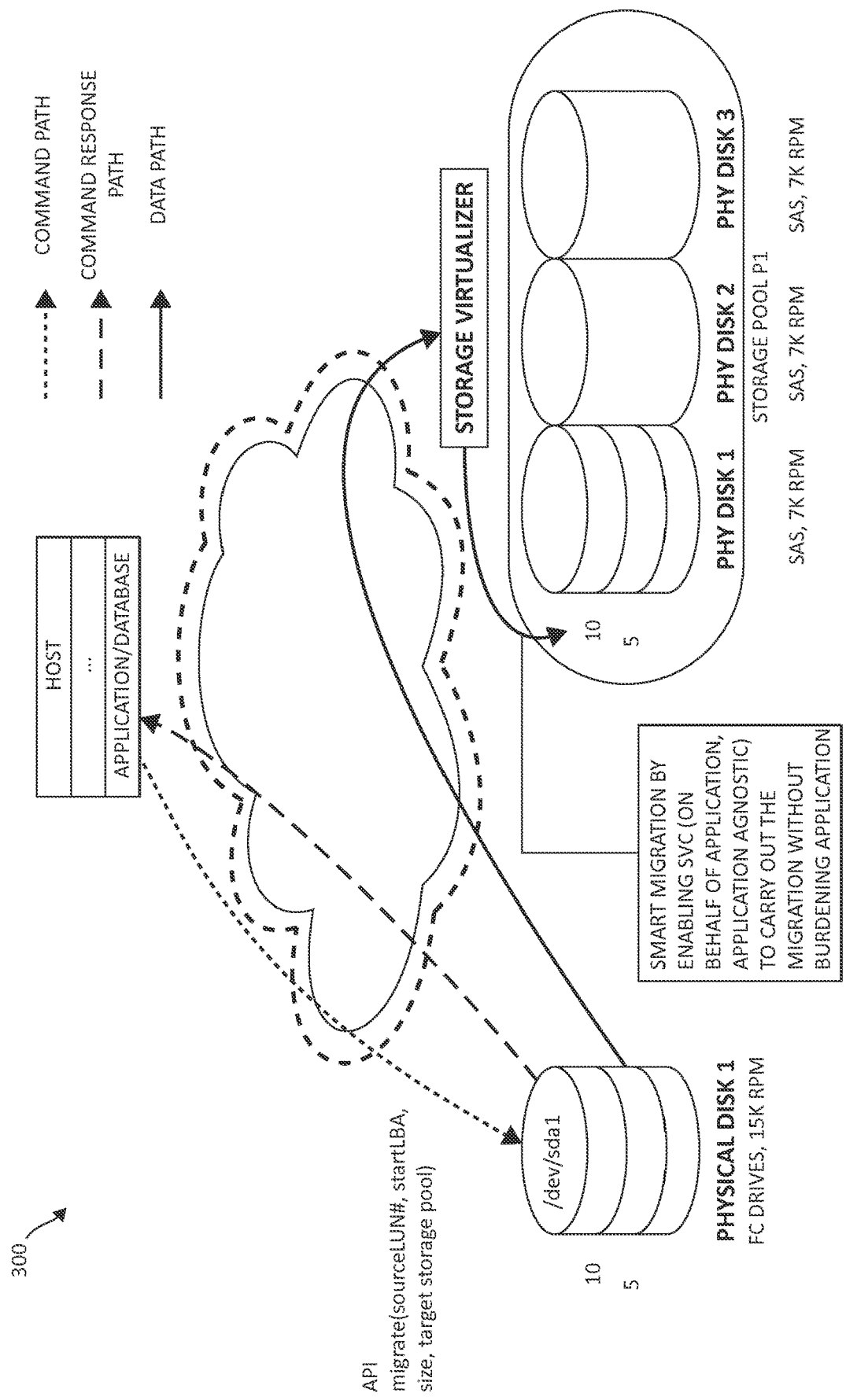
FIG. 3 is a block diagram of an exemplary method for performing sub-LUN level data migration in which aspects of the present invention may be implemented.
Figure 4:
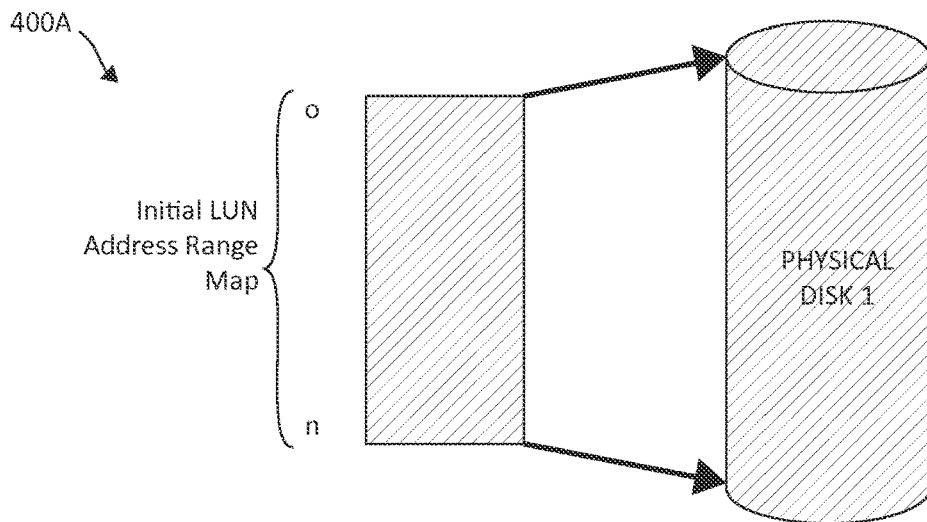
FIG. 4 is a block diagram of a first step of an exemplary method for changing a virtual-to-physical mapping for a LUN, again in which aspects of the present invention may be implemented.

In contrast to FIG. 2, FIGS. 3-4, following, illustrate exemplary embodiments according to the present invention. For example, in FIG. 3, following, a mechanism for smart sub-LUN level data migration using the executed API as previously described is illustrated.

FIGS. 3-4 describe how, for example, the API is executed and the advantages compared to the data migration mechanism that is provided by conventional mechanisms, such as that illustrated in FIG. 2 previously, that pulls data from the disk to the host and subsequently writes the data to the target location, consuming storage bandwidth and server power. In contrast, in FIG. 3, following, mechanism 300 depicts an exemplary method for sub-LUN data migration in which aspects of the present invention may be incorporated. Referring specifically to FIG. 3, in one embodiment, the invocation of the migration API is performed by an application local to the host but the data migration operation is executed by the storage controller. While other proprietary conventional data migration mechanisms (including other applications) determine what data to migrate and when, the migration operation is executed by the storage virtualizer without involving the host.

FIG. 3 depicts, in an illustrated embodiment, how sub-LUN data migration is executed according to the present invention. By use of the API, and using the illustrated exemplary command, the database application sends the exemplary command to migrate sub-LUN level data from the physical disk 1 (in this case depicted as FC 15 k drives) to a second physical location in storage pool P1 of PHY disks 1, 2, and 3 as shown (in the depicted embodiment consisting of SAS 7 k RPM drives configured in the illustrated storage pool). The command is returned to the host (and thereby, the database application). While the database application make decisions on what data to migrate and when, the migration operation itself is carried out by the storage virtualizer (e.g., storage virtualization engine 18, FIG. 1), without involvement of the host. Accordingly, and as shown, the data is intelligently migrated by enabling the virtualizer (such as SVC) on behalf of the application to carry out the migration without burdensome overhead to the application. The data is then migrated from the physical disk 1 to the storage pool P1 as shown by the data path.

Figure 5:
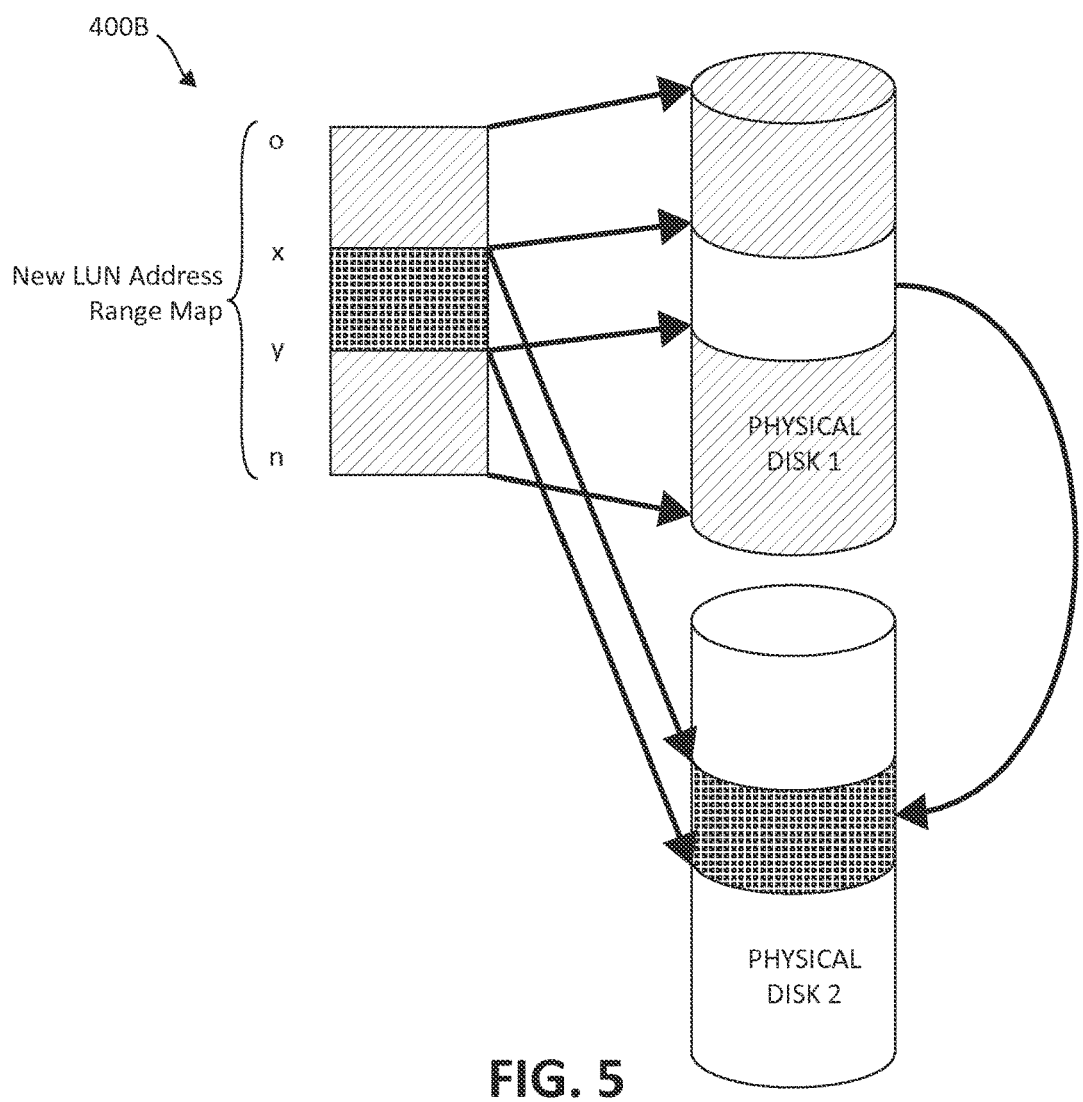
FIG. 5 is a block diagram of a second step in the exemplary method for changing the virtual-to-physical mapping previously described in FIG. 4, here again in which aspects of the present invention may be implemented.

Turning now to FIGS. 4 and 5, following, block diagrams of exemplary operations applied to the virtual-to physical mapping for a selected LUN is shown pursuant to the API-facilitated data migration mechanisms previously described. Note, the physical disks in these diagrams may actually be virtual volumes presented by the underlying storage controller (e.g., a RAID 5 volume). In one embodiment, the virtual-to physical mapping shown may be implemented as virtual disk map 15 (FIG. 1). As one of ordinary skill in the art will appreciate, however, various implementations of such mappings may occur to suit a particular application.

Turning first to FIG. 4, in a first step 400A, an initial LUN address range map (shown here addressed from 0 to n) is identified to correspond to an address range in the physical disk 1 as shown. In a second step 400B as shown in FIG. 5, following completion of a migration operation of a chunk of data to the target storage pool, a new LUN address range map is created with ranges x-y which are configured to point to the target storage pool in physical disk 2 corresponding to the chunk of data which has been migrated. The ranges 0-x and y-n are retained to point to the physical disk 1 as shown.

Figure 6:
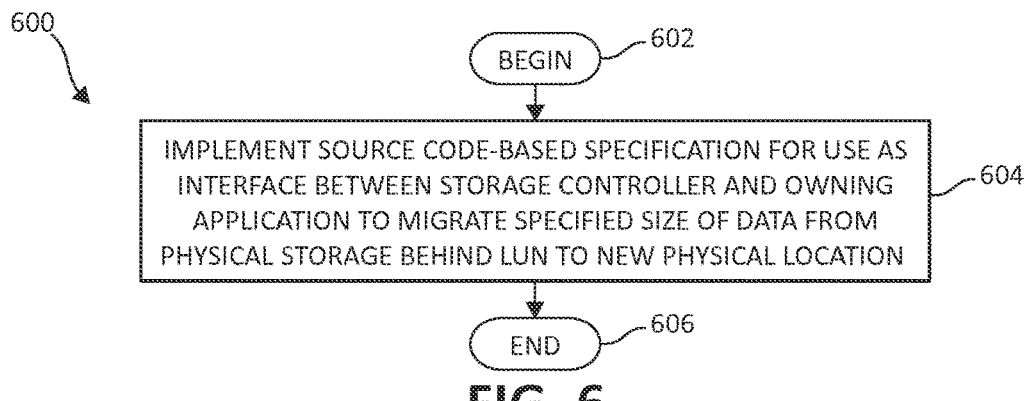
FIG. 6 is a flow chart diagram of an exemplary method for performing sub-LUN level data migration.

FIG. 6, following, is a flow chart diagram of an exemplary method 600 for performing sub-LUN level data migration in a computing storage environment, in which aspects of the present invention may be implemented. Method 600 begins (step 602) by implementing a source code-based specification for use as an interface between a storage controller and an owning application to migrate a specified, sub-LUN level size of data from physical storage behind the LUN to a new physical location (step 604). The method 600 then ends (step 606).

Figure 7:
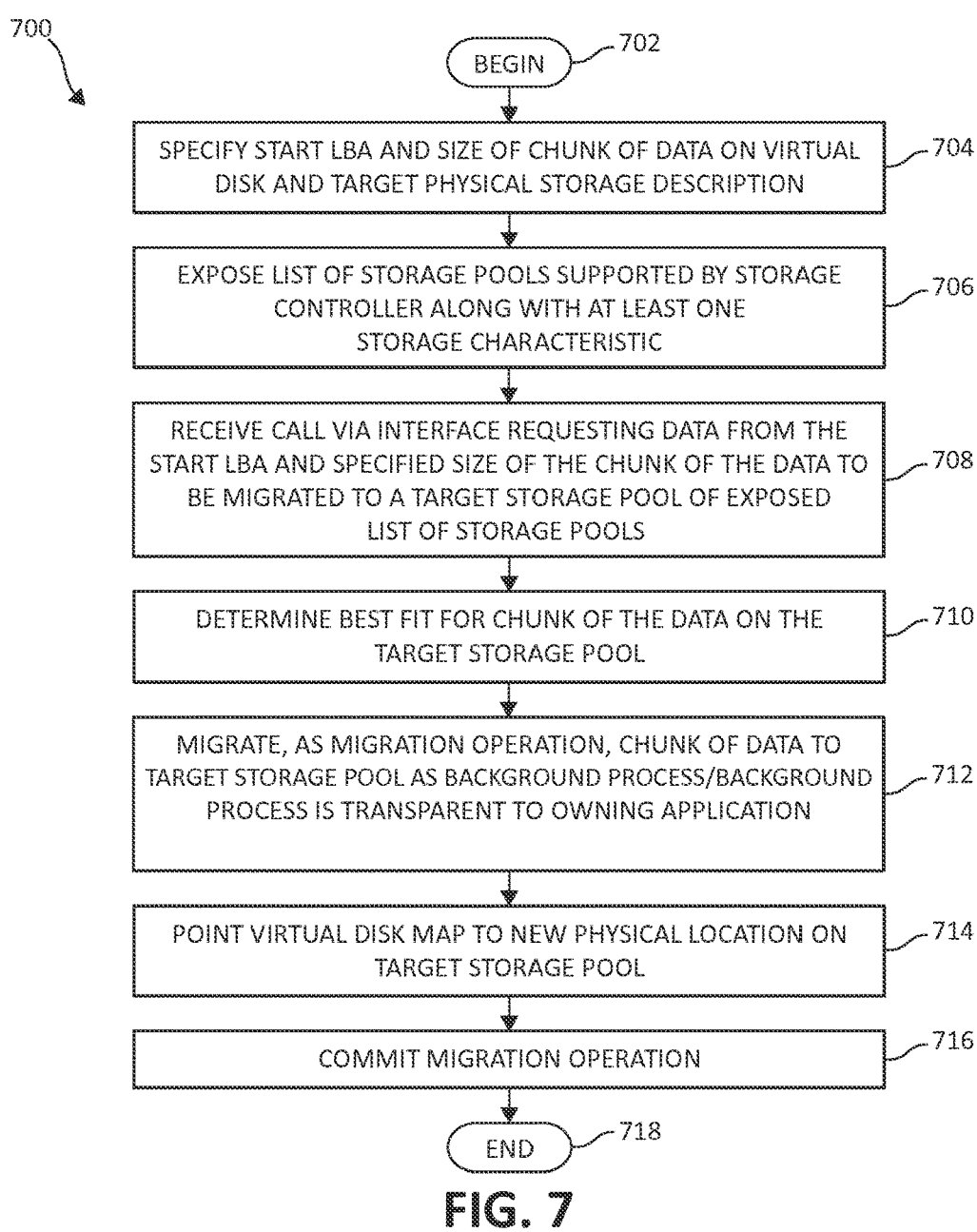
FIG. 7 is a flow chart diagram of an additional exemplary method for performing sub-LUN level data migration.

FIG. 7, following, is a flow chart of an additional exemplary method 700 for performing sub-LUN level data migration from a source to target storage location, here again in which various aspects of the present invention may be implemented. Method 700 begins (step 702) by specification of a start LBA and a size of a chunk of data on the virtual disk, and a target physical storage description (step 704). The source code based specification (e.g., API) then exposes a list of storage pools supported by the storage controller along with at least one storage characteristic, such as size, available space, physical characteristics of the underlying storage (e.g., SAS drives), and the like (step 706).

Based at least in part on the information obtained from step 706, the method 700 continues with receipt of a call (from, for example, the host) via the interface requesting data from the start LBA and specified size of the chunk of the data to be migrated to a target storage pool of the list of exposed storage pools (step 708). The storage controller or similar storage device may then determine a "best fit" for the chunk of the data in the target storage pool (step 710). For example, the chunk of data may be stored sequentially on one physical volume, or it may be split across multiple volumes as the situation may warrant, and again at the discretion of the storage controller or other management device.

As a following step, the migration operation commences, as the specified chunk of data is migrated to the target storage pool as a background process without involving overhead to the application (i.e., the process is conducted transparently to the owning application) (step 712). Following completion of the migration operation, the virtual disk map is made to point to the new physical location on the target storage pool (step 714). Once the change is made to the virtual disk map, the migration operation is committed (step 716). The method 700 then ends (step 718).

Figure 8:
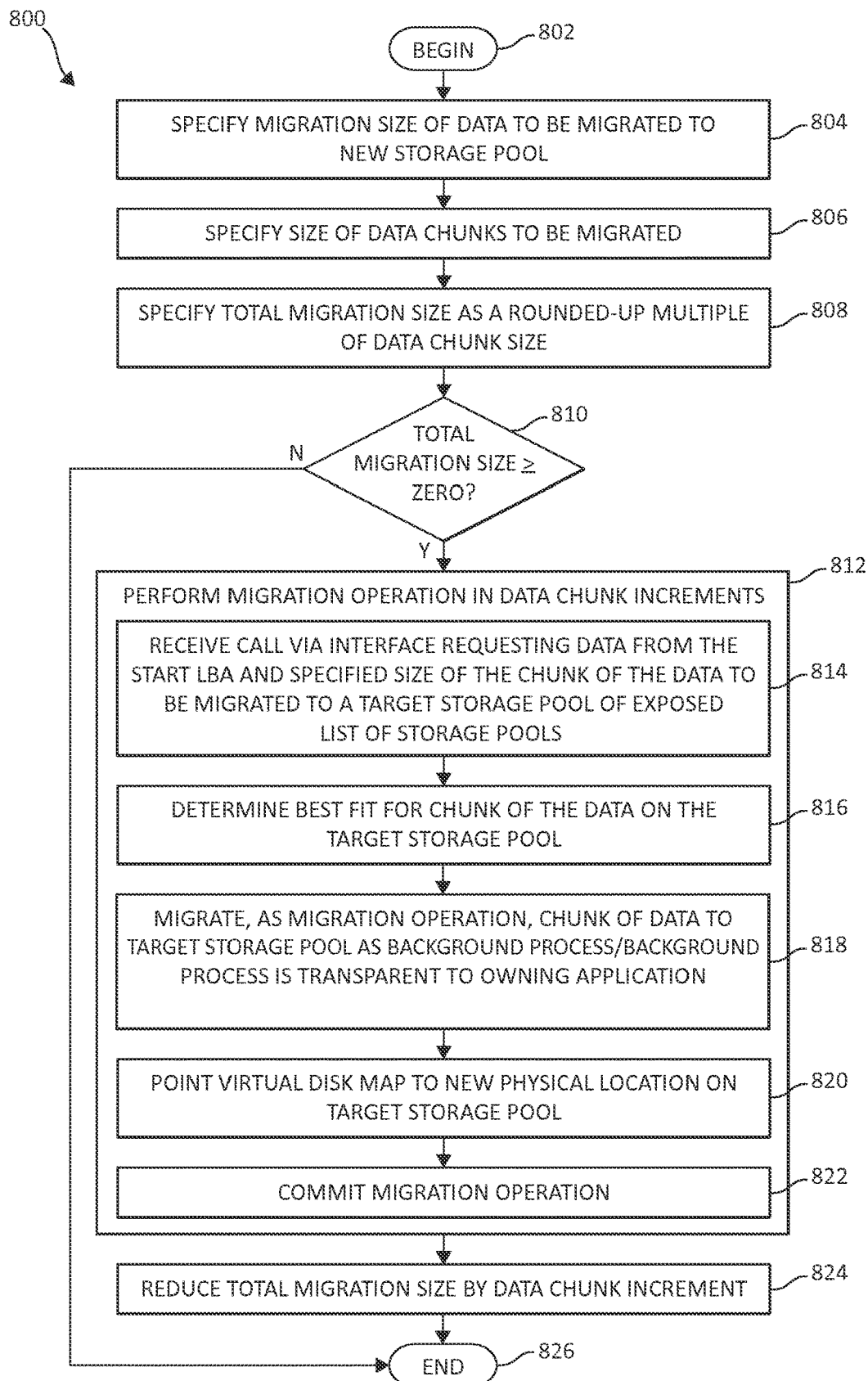
FIG. 8 is a flow chart diagram of an additional exemplary method for performing sub-LUN level data migration.

FIG. 8, following, illustrates an additional exemplary method 800 for performing sub-LUN level data migration from a source to target storage location according to another embodiment of the present invention. Method 800 begins (step 802) by specification of a migration size of data to be migrated to a new storage pool (step 804). A data chunk size to be migrated is then specified (step 806). A total migration size is specified as a founded-up multiple of the previously specified data chunk size (step 808).

Method 800 then moves to step 810, which queries if the total migration size is greater than or equal to zero. If no, the method 800 ends (step 826). Alternatively, the method 800 moves to step 812, where a migration operation is performed in data chunk-sized increments. The migration operation 812 includes similar functionality to at least some of the steps previously described in FIG. 7, such as receipt of the call via the API requesting data from the start LBA and specified size of the chunk of the data to be migrated (step 808), determining a best fit for the data chunk (step 810), migrating the data chunk to the target storage pool as the background process (step 812), pointing the virtual disk map to the new physical storage location (step 814), and committing the migration operation (step 816).

As method 800 proceeds to execute the migration operation 812, the total migration size is reduced by the data chunk increment being migrated (step 824). The method 800 returns to step 810 to again query whether the total migration size is greater than or equal to zero. Here, if the answer is affirmative, then the method 800 ends (step 826), otherwise returns to step 812 to perform another migration operation, again conducted in the data chunk-sized increment.

Figure 9:
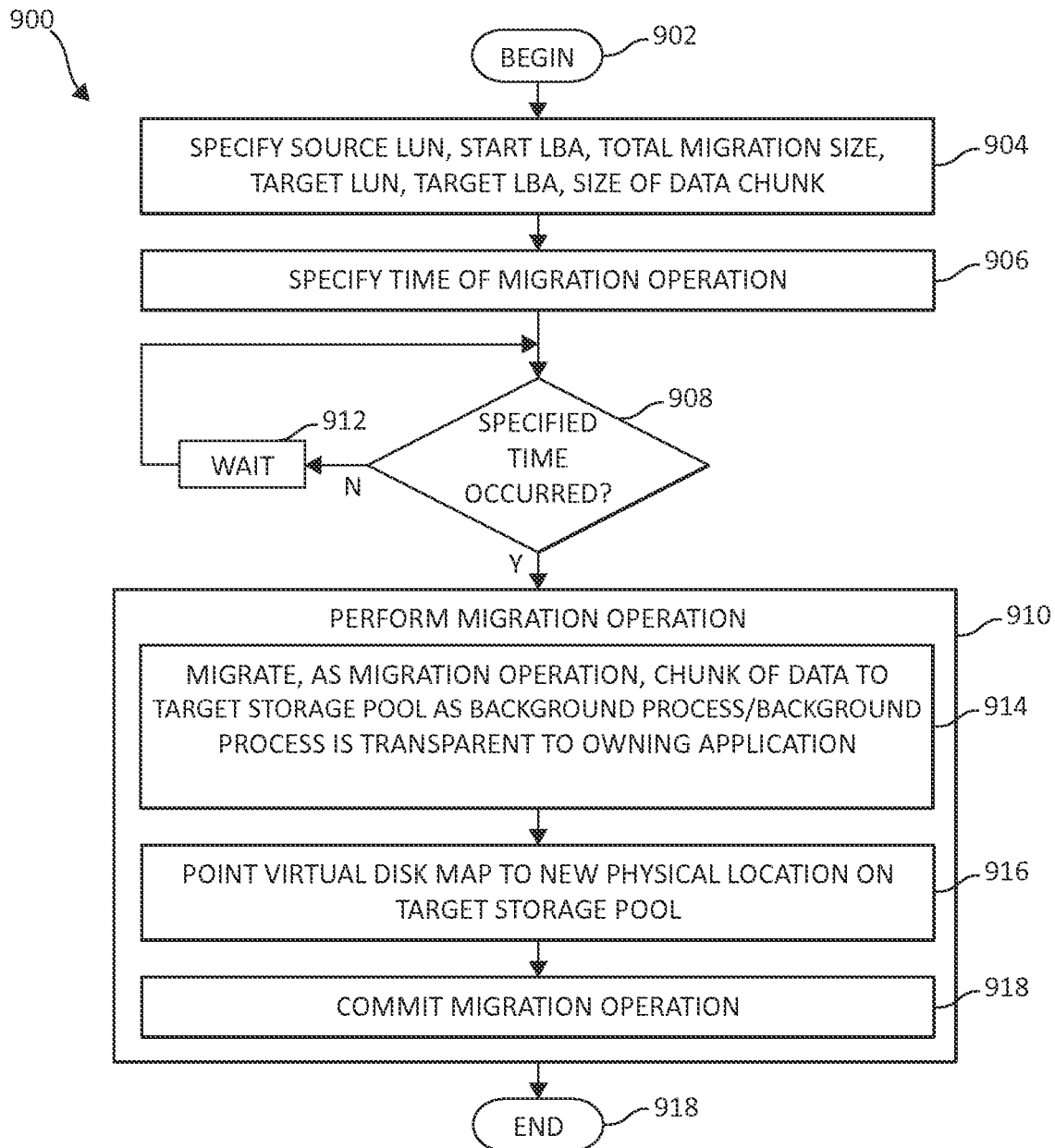
FIG. 9 is a flow chart diagram of an additional exemplary method for performing sub-LUN level data migration.

Turning now to FIG. 9, following, an additional exemplary method 900 for performing sub-LUN level data migration from a source to target storage location is illustrated. Method 900 begins (step 902) by specifying a source LUN, start LBA, total migration size, target LUN, and size of the data chunk to be migrated (step 904). The method 900 then specifies the time that the migration operation is to be performed (step 906). In step 908, following, if the specified time has arrived, then the migration operation 910 is performed as will be further described, following. Alternatively, if the specified time has not arrived (again, step 908), the method 900 waits (step 912), and returns to step 908 to again re-query.

At step 910, the migration operation performs similar functionality as previously illustrated in FIGS. 7 and 8, including migrating the data to the target storage pool as a background process transparent to the owning application (step 912), pointing the virtual disk map to the new physical location on the target storage pool (step 914), and committing the migration operation (step 916). The method then ends (step 918).

Figure 10:
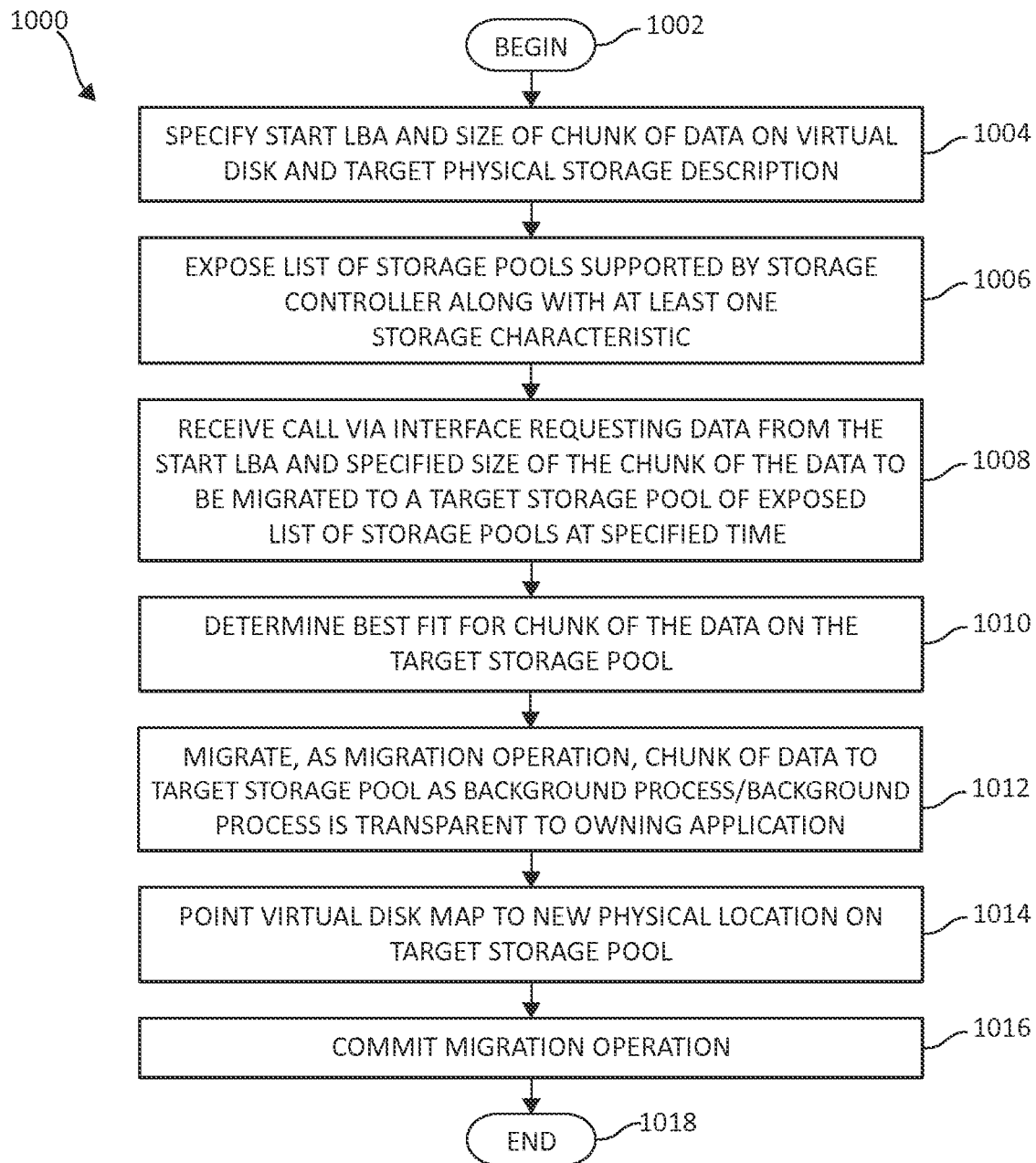
FIG. 10 is a flow chart diagram of an additional exemplary method for performing sub-LUN level data migration.

FIG. 10, following, illustrates an additional exemplary method 1000 for performing sub-LUN level data migration from a source to target storage location. Method 100 begins (step 1002) by specification of a start LBA and a size of a chunk of data on the virtual disk, and a target physical storage description (step 1004). The source code based specification (e.g., API) then exposes a list of storage pools supported by the storage controller along with at least one storage characteristic, such as size, available space, physical characteristics of the underlying storage (e.g., SAS drives), and the like (step 1006).

Based at least in part on the information obtained from step 1006, the method 1000 continues with receipt of a call (from, for example, the host) via the interface requesting data from the start LBA and specified size of the chunk of the data to be migrated to a target storage pool of the list of exposed storage pools at a specified time (step 1008). The storage controller or similar storage device may then determine a "best fit" for the chunk of the data in the target storage pool (step 1010). For example, the chunk of data may be stored sequentially on one physical volume, or it may be split across multiple volumes as the situation may warrant, and again at the discretion of the storage controller or other management device.

As a following step, the migration operation commences, as the specified chunk of data is migrated to the target storage pool as a background process without involving overhead to the application (i.e., the process is conducted transparently to the owning application) at the specified time (step 1012). Following completion of the migration operation, the virtual disk map is made to point to the new physical location on the target storage pool (step 1014). Once the change is made to the virtual disk map, the migration operation is committed (step 1016). The method 1000 then ends (step 1018).

Figure 11:
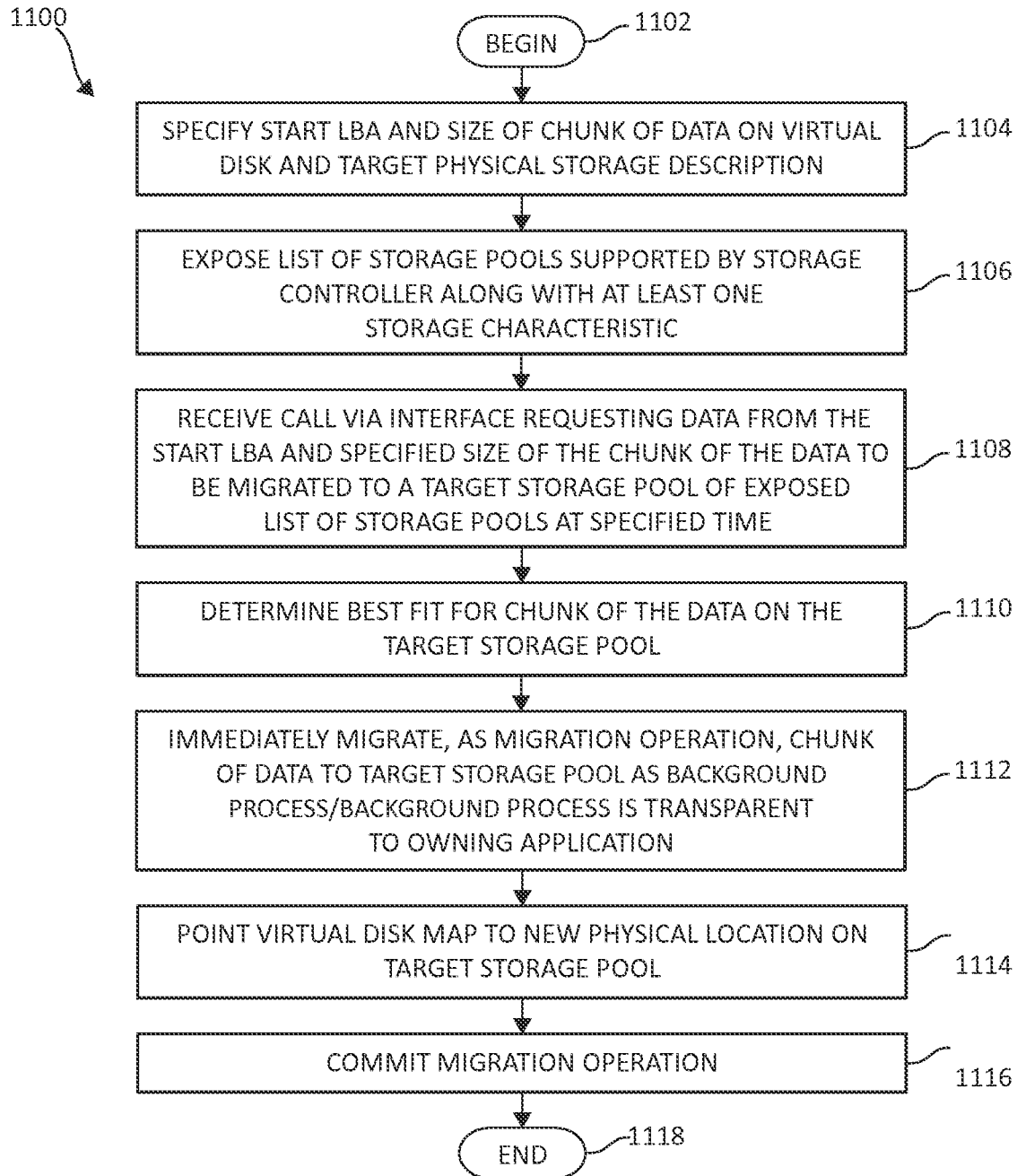
FIG. 11 is a flow chart diagram of an additional exemplary method for performing sub-LUN level data migration.

FIG. 11, following, illustrates an additional exemplary method 1100 for performing sub-LUN level data migration from a source to target storage location. Method 1100 begins (step 1102) by specification of a start LBA and a size of a chunk of data on the virtual disk, and a target physical storage description (step 1104). The source code based specification (e.g., API) then exposes a list of storage pools supported by the storage controller along with at least one storage characteristic, such as size, available space, physical characteristics of the underlying storage (e.g., SAS drives), and the like (step 1106).

Based at least in part on the information obtained from step 1106, the method 1000 continues with receipt of a call (from, for example, the host) via the interface requesting data from the start LBA and specified size of the chunk of the data to be migrated to a target storage pool of the list of exposed storage pools at a time coincident with receipt of the call (i.e., immediately) (step 1108). The storage controller or similar storage device may then determine a "best fit" for the chunk of the data in the target storage pool (step 1110). For example, the chunk of data may be stored sequentially on one physical volume, or it may be split across multiple volumes as the situation may warrant, and again at the discretion of the storage controller or other management device.

As a following step, the migration operation commences, as the specified chunk of data is migrated to the target storage pool as a background process without involving overhead to the application (i.e., the process is conducted transparently to the owning application) at the specified time (step 1112). Following completion of the migration operation, the virtual disk map is made to point to the new physical location on the target storage pool (step 1114). Once the change is made to the virtual disk map, the migration operation is committed (step 1116). The method 1100 then ends (step 1118).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for sub-Logical Unit Name (LUN) data migration by a processor in a computing environment, comprising:
   in host-based data migration, using an application programming interface (API) on a host to migrate as directed by an owning application comprising a database application executing on the host, from a specified source LUN to a new physical location on a specified target LUN and at a specific predetermined time as specified by the owning application, at least one specified sub-LUN data chunk, each of the at least one specified sub-LUN data chunks comprised of a single database table associated with and generated by the owning application such that the single database table associated with and generated by the owning application is individually migrated from within the specified source LUN to the specified target LUN in lieu of migrating an entire volume containing multiple ones of the database tables, the API functioning as an interface between a storage controller and the owning application, and the data being migrated based upon a frequency of access and a hardware Input/Output Operations per second (IOPs) rate of the target LUN; wherein the at least one specified sub-LUN data chunk is transferred transparently to the owning application such that the storage controller executes the migration independently notwithstanding the migration being commanded by the owning application, wherein the owning application specifies the source LUN and the target LUN;
   generating an API call by the database application executing on the host directly to the storage controller using the API to initiate the migration of the at least one sub-LUN data chunk such that, between a first time at which the database application determines the at least one sub-LUN data chunk should be migrated and a second time at which the storage controller completes the migration of the at least one sub-LUN data chunk to the specified target LUN, only a single migration instruction, comprising the API call issued by the database application on the host to the storage controller, is issued in connection with the migration of the at least one sub-LUN data chunk; wherein the storage controller comprises a storage server managing Input/Ouput (I/O) requests to read and write data from multiple hosts including the host to storage pools over a Storage Area Network (SAN); wherein a migration size of the data migrated commensurate with the API call is fixed such that additional instances of the API call are generated until the migration of the chunk of the data is completed;
   exposing to the database application, using the API, a list of physical storage devices of the storage pools supported by the storage controller along with at least one storage characteristic associated with at least one of the list of the storage pools; wherein the storage characteristic includes at least a size and an available storage space; and
   responsive to receiving the exposed list of physical storage devices of the storage pools supported by the storage controller, determining a best fit for the at least one specified sub-LUN data chunk on the target storage pool by the storage controller according to an identification as to whether the at least one specified sub-LUN data chunk should be stored on one physical volume and whether the at least one specified sub-LUN data chunk should be split across multiple physical volumes.

2. The method of claim 1, further including specifying, by the owning application in operable communication with the API, a start Logical Block Address (LBA) and the size of the sub-LUN data chunk on a virtual disk and a target physical storage description to identify the new physical location.

3. The method of claim 2, further including receiving the API call via the API requesting data from the start LBA and the at least one specified sub-LUN data chunk to be migrated to a target storage pool of the exposed list of storage pools.

4. The method of claim 1, further including, as a migration operation, migrating the sub-LUN data chunk to the target storage pool as a background process, the background process transparent to the owning application.

5. The method of claim 4, further including pointing a virtual disk map to the new physical location on the target storage pool.

6. The method of claim 5, further including, subsequent to completing pointing the virtual disk map to the new physical location, committing the migration operation.

7. The method of claim 1, further including one of providing the API inline to the owning application via a small computer systems interface (SCSI), and providing the API out-of-band to the owning application via an internet protocol (IP).

8. A method for sub-Logical Unit Name (LUN) data migration by a processor in a computing environment, comprising:
   in host-based data migration, using an application programming interface (API) on a host to migrate as directed by an owning application comprising a database application executing on the host, from a specified source LUN to a new physical location on a specified target LUN and at a specific predetermined time as specified by the owning application, at least one specified sub-LUN data chunk, each of the at least one specified sub-LUN data chunks comprised of a single database table associated with and generated by the owning application such that the single database table associated with and generated by the owning application is individually migrated from within the specified source LUN to the specified target LUN in lieu of migrating an entire volume containing multiple ones of the database tables, the API functioning as an interface between a storage controller and the owning application, and the data being migrated based upon a frequency of access and a hardware Input/Output Operations per second (IOPs) rate of the target LUN; wherein the at least one specified sub-LUN data chunk is transferred transparently to the owning application such that the storage controller executes the migration independently notwithstanding the migration being commanded by the owning application, wherein the owning application specifies the source LUN and the target LUN;
  wherein the API facilitates the storage controller to migrate the at least one specified sub-LUN data chunk at an approximately coincident time the owning application performs an API call using the API to perform the migration;
  generating the API call by the database application executing on the host directly to the storage controller using the API to initiate the migration of the at least one sub-LUN data chunk such that, between a first time at which the database application determines the at least one sub-LUN data chunk should be migrated and a second time at which the storage controller completes the migration of the at least one sub-LUN data chunk to the specified target LUN, only a single migration instruction, comprising the API call issued by the database application on the host to the storage controller, is issued in connection with the migration of the at least one sub-LUN data chunk; wherein the storage controller comprises a storage server managing Input/Ouput (I/O) requests to read and write data from multiple hosts including the host to storage pools over a Storage Area Network (SAN); wherein a migration size of the data migrated commensurate with the API call is fixed such that additional instances of the API call are generated until the migration of the chunk of the data is completed;
  exposing to the database application, using the API, a list of physical storage devices of the storage pools supported by the storage controller along with at least one storage characteristic associated with at least one of the list of the storage pools; wherein the storage characteristic includes at least a size and an available storage space; and
  responsive to receiving the exposed list of physical storage devices of the storage pools supported by the storage controller, determining a best fit for the at least one specified sub-LUN data chunk on the target storage pool by the storage controller according to an identification as to whether the at least one specified sub-LUN data chunk should be stored on one physical volume and whether the at least one specified sub-LUN data chunk should be split across multiple physical volumes.

9. The method of claim 8, further including specifying, by the owning application in operable communication with the API, a start Logical Block Address (LBA) and the size of the sub-LUN data chunk on a virtual disk and a target physical storage description to identify the new physical location.

10. The method of claim 9, further including receiving the API call via the API requesting data from the start LBA and the at least one specified sub-LUN data chunk to be migrated to a target storage pool of the exposed list of storage pools.

11. The method of claim 8, further including, as a migration operation, migrating the sub-LUN data chunk to the target storage pool as a background process, the background process transparent to the owning application.

12. The method of claim 11, further including pointing a virtual disk map to the new physical location on the target storage pool.

13. The method of claim 12, further including, subsequent to completing pointing the virtual disk map to the new physical location, committing the migration operation.

14. The method of claim 8, further including one of providing the API inline to the owning application via a small computer systems interface (SCSI), and providing the API out-of-band to the owning application via an internet protocol (IP).

15. A method for sub-Logical Unit Name (LUN) data migration by a processor in a computing environment, comprising:
  in host-based data migration, using an application programming interface (API) on a host to migrate as directed by an owning application comprising a database application executing on the host, from a specified source LUN to a new physical location on a specified target LUN and at a specific predetermined time as specified by the owning application, at least one specified sub-LUN data chunk, each of the at least one specified sub-LUN data chunks comprised of a single database table associated with and generated by the owning application such that the single database table associated with and generated by the owning application is individually migrated from within the specified source LUN to the specified target LUN in lieu of migrating an entire volume containing multiple ones of the database tables, the API functioning as an interface between a storage controller and the owning application, and the data being migrated based upon a frequency of access and a hardware Input/Output Operations per second (IOPs) rate of the target LUN; wherein the at least one specified sub-LUN data chunk is transferred transparently to the owning application such that the storage controller executes the migration independently notwithstanding the migration being commanded by the owning application, wherein the owning application specifies the source LUN and the target LUN;
  generating the API call by the database application executing on the host directly to the storage controller using the API to initiate the migration of the at least one sub-LUN data chunk such that, between a first time at which the database application determines the at least one sub-LUN data chunk should be migrated and a second time at which the storage controller completes the migration of the at least one sub-LUN data chunk to the specified target LUN, only a single migration instruction, comprising the API call issued by the database application on the host to the storage controller, is issued in connection with the migration of the at least one sub-LUN data chunk; wherein the storage controller comprises a storage server managing Input/Ouput (I/O) requests to read and write data from multiple hosts including the host to storage pools over a Storage Area Network (SAN); wherein a migration size of the data migrated commensurate with the API call is fixed such that additional instances of the API call are generated until the migration of the chunk of the data is completed;

exposing to the database application, using the API, a list of physical storage devices of the storage pools supported by the storage controller along with at least one storage characteristic associated with at least one of the list of the storage pools; wherein the storage characteristic includes at least a size and an available storage space; and responsive to receiving the exposed list of physical storage devices of the storage pools supported by the storage controller, determining a best fit for the at least one specified sub-LUN data chunk on the target storage pool by the storage controller according to an identification as to whether the at least one specified sub-LUN data chunk should be stored on one physical volume and whether the at least one specified sub-LUN data chunk should be split across multiple physical volumes.

16. The method of claim 15, further including specifying, by the owning application in operable communication with the API, a start Logical Block Address (LBA) and the size of the sub-LUN data chunk on a virtual disk and a target physical storage description to identify the new physical location.

17. The method of claim 16, further including receiving the API call via the API requesting data from the start LBA and the at least one specified sub-LUN data chunk to be migrated to a target storage pool of the exposed list of storage pools.

18. The method of claim 15, further including, as a migration operation, migrating the sub-LUN data chunk to the target storage pool as a background process, the background process transparent to the owning application.

19. The method of claim 18, further including pointing a virtual disk map to the new physical location on the target storage pool.

20. The method of claim 19, further including, subsequent to completing pointing the virtual disk map to the new physical location, committing the migration operation.

21. The method of claim 15, further including one of providing the API inline to the owning application via a small computer systems interface (SCSI), and providing the API out-of-band to the owning application via an internet protocol (IP).

* * * * *